Jan. 15, 1946.  C. L. EKSERGIAN  2,393,032
RAIL CAR WHEEL BRAKE
Filed Nov. 8, 1943

INVENTOR
Carolus L. Eksergian.
BY John P. Barbop
ATTORNEY

Patented Jan. 15, 1946

2,393,032

UNITED STATES PATENT OFFICE 2,393,032

RAIL CAR WHEEL BRAKE

Carolus L. Eksergian, Detroit, Mich., assignor to Budd Wheel Company, Philadelphia, Pa., a corporation of Pennsylvania Application November 8, 1943, Serial No. 509,354

3 Claims. (Cl. 188—218)

The invention relates to rail car wheels and particularly to such wheels in which the braking is done directly on the wheels.

Rail car wheels, as heretofore constructed, are usually adapted to have the braking done on the outer periphery of the wheel. If sufficient braking is to be obtained in this way, heavy pressure has to be applied to the shoe or shoes engaging the wheel, resulting in rapid wear and excessive generation of heat. Both of these factors are undesirable.

It is an object of the invention to provide a rail than wheels heretofore so utilized and in which provision is made for adequate cooling of the car wheel better adapted to braking thereon wheel in the vicinity of the braking surfaces.

These objects are in part achieved by forming the rim of the wheel both on its outer and inner peripheries with braking faces, so that brake shoes may simultaneously be brought into braking engagement with both faces, thus requiring less pressure per unit of shoe area to secure equal braking and also, because of the smaller pressure, the generation of heat is reduced. Moreover, the heat generated is rapidly dissipated, and a further object of the invention achieved, by the provision of effective cooling means, which may take the form of spaced passages extending between the braking faces on the rim, and ternection to the wheel body and at their inner ends minating at their radially outer ends in openings in the side of the rim remote from its conin radial channels formed by ribs on the wheel body. Other and further objects and the manner in which they are attained will become apparent from the following detailed description when read in connection with the drawing forming a part hereof.

Figure 1:
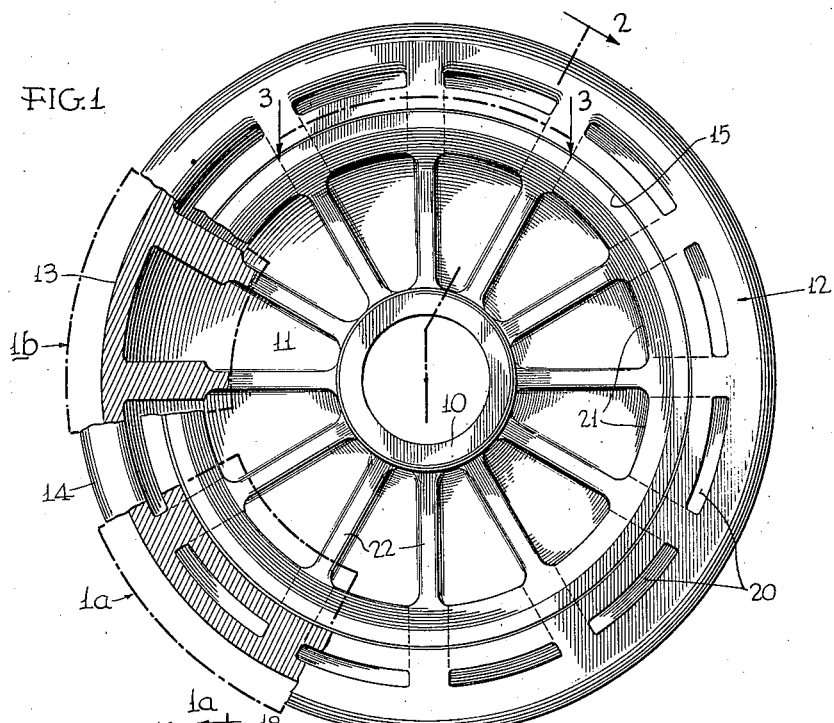
Fig. 1 shows, in inside elevational view, a car wheel according to the invention, parts being broken away and shown in section on the lines indicated in Fig. 2 by the section lines 1a—1a and 1b—1b.

The wheel according to the invention may be made of any suitable cast or wrought metal and comprises the hub 10 from which extends the dished body portion 11, whose periphery merges into the laterally extending rim portion 12. By dishing the body, the wheel is strengthened and the load carrying tread of the rim is brought substantially over the center of the hub.

The outer periphery of the rim is formed with the frusto-conical tread portion 13, which serves also as a braking surface, and the flange 14. The inner peripheral portion of the rim is formed with a cylindrical braking surface 15 of substantially the same width as the outer braking surface 13. To effect the braking, the outer and inner braking surfaces are engaged by segmental brake shoes, indicated, respectively at 16 and 17. These shoes may be actuated to braking engagement by any known means, such as the levers 18 and 19 pivotally mounted on a fixed support, and actuated by a common brake cylinder means (not shown).

Figure 2:
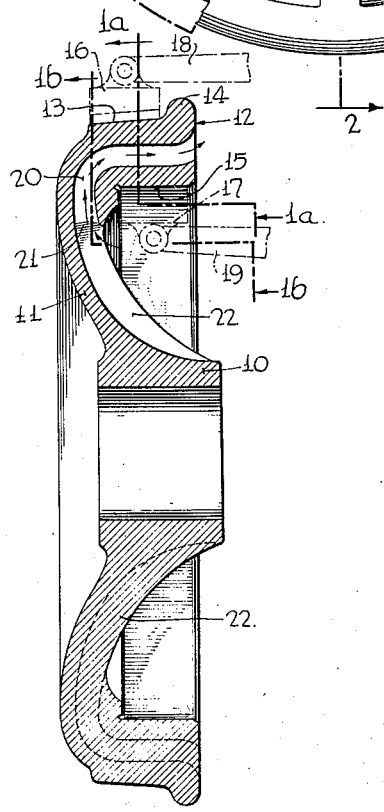
Fig. 2 is a sectional view of the wheel, the section being taken along the line 2—2 of Fig. 1.
Figure 3:
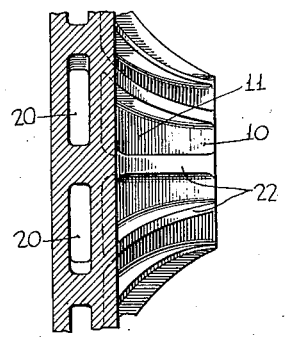
Fig. 3 is a fragmentary sectional view, the section being taken on the line 3—3 of Fig. 1.

To provide adequate cooling of the braking faces, the outer portion of the wheel body 11, approximately where it merges with the rim 12, and the rim are formed with spaced air passages 20, which open radially inwardly, at 21, Fig. 2, extend radially and then curve laterally to extend between the braking faces on the rim and at their extreme outer ends open to the lateral inner face of the rim. These passages pass through the rim substantially midway between the outer and inner braking faces 13 and 15 so that, as air flows through the passages in the direction indicated by the arrows, Fig. 2, during the rotation of the wheel, it is accelerated by centrifugal force, and the heat developed in the braking passes by conduction first through the metal of the rim to these passages, and is there rapidly carried off by the accelerated air streaming through them.

To further accelerate the air stream entering the closed passages 20 laterally open radial passages lead thereto, these being formed by spaced radial ribs 22 projecting laterally from the wheel body on the side thereof from which the wheel rim extends. These ribs 22 are shown as extending from the inner openings 21 of the passages 20 to the hub 10. In addition to providing channels to direct the cooling air outwardly into the passages 20, these ribs serve to strengthen and stiffen the wheel body.

While a specific form of the invention has been shown and described herein, it will be understood that changes and modifications may be made by those skilled in the art without departing from the main features of the invention, and such changes and modifications are intended to be covered by the appended claims.

What is claimed is:

1. A rail car wheel having a body portion and a rim portion extending laterally from the periphery of the body portion, said rim portion being formed on its radially outer and inner faces with braking surfaces, and spaced cooling passages extending between the outer and inner braking surfaces.

2. A rail car wheel having a body portion and a rim portion extending laterally from the periphery of the body portion, said rim portion being formed on its radially outer and inner faces with braking surfaces, and spaced cooling passages opening radially inwardly in the region of joinder of body and rim and extending laterally across the rim portion between the outer and inner braking faces thereof.

3. A rail car wheel having a body portion and a rim portion extending laterally from the periphery of the body portion, said rim portion being formed on its radially outer and inner faces with braking surfaces, spaced ribs on the wheel body on the side thereof from which the rim extends, the spaces between the outer ends of the ribs communicating with cooling passages, respectively, extending between the outer and inner braking surfaces.

CAROLUS L. EKSERGIAN.